United States Patent
Li et al.

(10) Patent No.: US 11,736,524 B2
(45) Date of Patent: Aug. 22, 2023

(54) NETWORK TRAFFIC SENDING METHOD AND APPARATUS, AND HYBRID HONEYPOT SYSTEM

(71) Applicant: Siemens Aktiengesellschaft, Munich (DE)

(72) Inventors: Rui Li, Beijing (CN); Lin Qi, Beijing (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 229 days.

(21) Appl. No.: 16/954,569

(22) PCT Filed: Dec. 27, 2017

(86) PCT No.: PCT/CN2017/119117
§ 371 (c)(1),
(2) Date: Jun. 17, 2020

(87) PCT Pub. No.: WO2019/127141
PCT Pub. Date: Jul. 4, 2019

(65) Prior Publication Data
US 2020/0336510 A1    Oct. 22, 2020

(51) Int. Cl.
*H04L 9/40* (2022.01)
*G06N 20/00* (2019.01)
*G06N 5/04* (2023.01)

(52) U.S. Cl.
CPC .......... *H04L 63/1491* (2013.01); *G06N 5/04* (2013.01); *G06N 20/00* (2019.01)

(58) Field of Classification Search
CPC ............. H04L 63/1491; H04L 63/1475; H04L 63/1483
See application file for complete search history.

(56) References Cited

U.S. PATENT DOCUMENTS

| | | | |
|---|---|---|---|
| 10,069,854 B2* | 9/2018 | Boggs | .............. H04L 63/1491 |
| 11,349,869 B1* | 5/2022 | Moeck | ................ H04L 67/10 |

(Continued)

FOREIGN PATENT DOCUMENTS

| | | |
|---|---|---|
| CN | 101087196 A | 12/2007 |
| CN | 103139184 A | 6/2013 |

(Continued)

OTHER PUBLICATIONS

Fan, Wenjun et al: "Adaptive and Flexible Virtual Honeynet"; Nov. 25, 2015: ICIAP: International Conference on Image Anal Ysis and Processing; 17th International Conference, Naples, Italy; Sep. 9-13, 2013; Proceedings; Springer; Berlin; Heidelberg, pp. 1-17; XP047421931; ISBN: 978-3-642-17318-9.

(Continued)

*Primary Examiner* — Ashokkumar B Patel
*Assistant Examiner* — William B Jones
(74) *Attorney, Agent, or Firm* — Harness, Dickey & Pierce, P.L.C.

(57) ABSTRACT

A network traffic sending method and apparatus, and a hybrid honeypot system are provided. The method includes receiving a first attack traffic flow; determining that a request type of the first attack traffic flow is a first request type and determining maturity of a virtual honeypot model for the first request type. Upon the maturity of the virtual honeypot model for the first request type being higher than a threshold set for the first request type, the method includes forwarding the first attack traffic flow to a virtual honeypot using the model, or forwarding the first attack traffic flow to a virtual honeypot using the model and a physical honeypot. Otherwise, it includes forwarding the first attack traffic flow to a physical honeypot. Therefore, a virtual honeypot using a virtual honeypot model of relatively high maturity is used to respond to an attack traffic flow.

12 Claims, 3 Drawing Sheets

(56) References Cited

U.S. PATENT DOCUMENTS

| | | | |
|---|---|---|---|
| 2012/0204264 A1 | 8/2012 | Jiang | |
| 2016/0164894 A1 | 6/2016 | Zeitlin et al. | |
| 2018/0322292 A1* | 11/2018 | Tedeschi | H04L 63/1433 |
| 2019/0081980 A1* | 3/2019 | Luo | G06N 7/005 |
| 2020/0336510 A1* | 10/2020 | Li | G06N 20/00 |
| 2020/0366714 A1 | 11/2020 | Wright | |

FOREIGN PATENT DOCUMENTS

| | | |
|---|---|---|
| CN | 104506507 A | 5/2015 |
| CN | 105553948 A | 5/2016 |
| CN | 106941493 A | 7/2017 |
| CN | 106961442 A | 7/2017 |
| CN | 107404465 A | 11/2017 |
| CN | 107426242 A | 12/2017 |
| WO | WO 2017145001 A1 | 8/2017 |

OTHER PUBLICATIONS

Extended European Search Report dated May 10, 2021.

Huang Yan et al:"A Computer Security System based on Dynamic Hybrid Honeypot Technology", Academic Research, vol. 7, p. 129-131, 1009-8054(2012)07-129-03, Jul. 10, 2012.

Yan Lok Kwong: "Virtual Honeynets Revisited", Proceedings of the 2005 IEEE Workshop on Information Assurance and Security United States Military Academy, West Point, NY, p. 232-239, Aug. 15, 2005.

Chen Hao et al:"The Honeypot Technology Application in Intrusion Detection System", Computer Knowledge and Technology, ISSN 1009-3044, 1009-3044(2009)25-7125-02, vol. 5,No. 25, ,pp. 7125-7126, Sep. 5, 2009.

Zhai Jiqiang et al:"Research and Analysis of Honeypot Technology", vol. 3, 1002-2422( 2006) 03-0019-03, p. 19-21, Jun. 1, 2006.

* cited by examiner

NETWORK TRAFFIC SENDING METHOD AND APPARATUS, AND HYBRID HONEYPOT SYSTEM

PRIORITY STATEMENT

This application is the national phase under 35 U.S.C. § 371 of PCT International Application No. PCT/CN2017/119117 which has an International filing date of Dec. 27, 2017, which designated the United States of America, the entire contents of each of which are hereby incorporated herein by reference.

FIELD

Embodiments of the present application generally relate to the field of network technologies, and in particular, to a network traffic sending method and apparatus, and a hybrid honeypot system.

RELATED ART

A honeypot technology is essentially a technology for cheating an attacker. In the honeypot technology, some hosts as decoys are disposed to lure an attacker to attack the hosts, so as to capture and analyze an attack behavior, learn a tool and a method used by the attacker, and figure out an attack intention and motivation, so that defenders can clearly understand a security threat they are facing, and improve a security protection capability of a protected system by technical and management means.

An existing honeypot system includes a physical honeypot and a virtual honeypot. A physical honeypot is highly interactive, but costs of deploying a large quantity of physical honeypots in the honeypot system are relatively high. A virtual honeypot emulates a real physical honeypot by using software and has relatively low costs, but the virtual honeypot is mainly created manually. Consequently, a relatively fixed response mode is configured for the virtual honeypot, and the virtual honeypot is easily identified by an attacker and has relatively poor interactivity.

SUMMARY

Embodiments of the present invention provide a network traffic sending method and apparatus, and a hybrid honeypot system, so as to resolve a problem that a virtual honeypot is easily identified by an attacker.

According to a first embodiment, a network traffic sending method includes:
receiving a first attack traffic flow;
determining that a request type of the first attack traffic flow is a first request type;
determining maturity of a virtual honeypot model for the first request type, where the maturity of the virtual honeypot model for the first request type is used to indicate a similarity between a first virtual response traffic flow and a first physical response traffic flow, a first virtual response traffic flow is a response traffic flow that can be generated, in response to an attack traffic flow having the first request type, by a virtual honeypot using the virtual honeypot model, a first physical response traffic flow is a response traffic flow that can be generated by a physical honeypot in response to an attack traffic flow having the first request type, and a higher similarity indicates higher maturity of the virtual honeypot model for the first request type; and if the maturity of the virtual honeypot model for the first request type is higher than a preset maturity threshold that is set for the first request type, forwarding the first attack traffic flow to a virtual honeypot using the virtual honeypot model;
otherwise, forwarding the first attack traffic flow to a physical honeypot; or if the maturity of the virtual honeypot model for the first request type is higher than the preset maturity threshold, forwarding the first attack traffic flow to a virtual honeypot using the virtual honeypot model and a physical honeypot;
otherwise, forwarding the first attack traffic flow only to a physical honeypot.

According to a second embodiment, a network traffic sending apparatus includes:
a network traffic flow distributor, configured to:
receive a first attack traffic flow;
determine that a request type of the first attack traffic flow is a first request type;
determine maturity of a virtual honeypot model for the first request type, where the maturity of the virtual honeypot model for the first request type is used to indicate a similarity between a first virtual response traffic flow and a first physical response traffic flow, a first virtual response traffic flow is a response traffic flow that can be generated, in response to an attack traffic flow having the first request type, by a virtual honeypot using the virtual honeypot model, a first physical response traffic flow is a response traffic flow that can be generated by a physical honeypot in response to an attack traffic flow having the first request type, and a higher similarity indicates higher maturity of the virtual honeypot model for the first request type; and
if the maturity of the virtual honeypot model for the first request type is higher than a preset maturity threshold that is set for the first request type, forward the first attack traffic flow to a virtual honeypot using the virtual honeypot model;
otherwise, forward the first attack traffic flow to a physical honeypot; or if the maturity of the virtual honeypot model for the first request type is higher than the preset maturity threshold, forward the first attack traffic flow to a virtual honeypot and a physical honeypot;
otherwise, forward the first attack traffic flow only to a physical honeypot.

According to a third embodiment, a hybrid honeypot system includes: the network traffic flow distributor according to the second aspect, at least one physical honeypot, and at least one virtual honeypot. The network traffic flow distributor is configured to:
receive a first attack traffic flow;
determine that a request type of the first attack traffic flow is a first request type;
determine maturity of a virtual honeypot model for the first request type, where the maturity of the virtual honeypot model for the first request type is used to indicate a similarity between a first virtual response traffic flow and a first physical response traffic flow, a first virtual response traffic flow is a response traffic flow that can be generated, in response to an attack traffic flow having the first request type, by a virtual honeypot using the virtual honeypot model, a first physical response traffic flow is a response traffic flow that can be generated by a physical honeypot in response to an attack traffic flow having the first request type, and a higher similarity indicates higher maturity of the virtual honeypot model for the first request type; and if the maturity of the virtual honeypot model for the first request type is higher than a preset maturity threshold that is set for the first request type, forward the first attack traffic flow to a virtual honeypot using the virtual honeypot model; otherwise, forward the first attack traffic flow to a physical honeypot; or if the maturity of the virtual honeypot model for the first request type is higher than the preset maturity threshold, forward the first attack traffic flow to a virtual honeypot using the virtual honeypot model and a physical honeypot; otherwise, forward the first attack traffic flow only to a physical honeypot.

According to a fourth embodiment, a network traffic sending apparatus includes:

at least one memory, configured to store machine readable code; and at least one processor, configured to execute the machine readable code stored in the memory, to implement the method according to any one of the first aspect or the optional implementations of the first aspect.

According to a fifth embodiment, a machine readable medium is provided, where the machine readable medium stores machine readable code, and when the machine readable code is executed by at least one processor, the method according to any one of the first aspect or the optional implementations of the first aspect is implemented.

LIST OF REFERENCE NUMERALS

| 100: Hybrid honeypot system | 101: Network traffic flow distributor | 102: Network traffic flow learning module |
|---|---|---|
| 103: Physical honeypot | 104: Virtual honeypot | |
| 200: A network traffic flow distributor 101 receives a first attack traffic flow | | |
| 210: The network traffic flow distributor 101 determines that a request type of the first attack traffic flow is a first request type | | |
| 220: The network traffic flow distributor 101 determines maturity of a virtual honeypot model for the first request type | | |
| 230: The network traffic flow distributor 101 determines whether the maturity of the virtual honeypot model for the first request type is greater than a preset maturity threshold that is set for the first request type; and if yes, performs step 240a or step 240b; otherwise, performs step 250 | | |
| 240a: The network traffic flow distributor 101 forwards the first attack traffic flow to a virtual honeypot 104 using the model | | |
| 240b: The network traffic flow distributor 101 forwards the first attack traffic flow to a virtual honeypot 104 using the model and a physical honeypot 103 | | |
| 250: The network traffic flow distributor 101 forwards the first attack traffic flow to a physical honeypot 103 | | |
| 300: Network traffic sending apparatus | 301: Memory | 302: Processor |
| 303: Communications interface | | |

DETAILED DESCRIPTION OF THE EXAMPLE EMBODIMENTS

According to a first embodiment, a network traffic sending method includes:

receiving a first attack traffic flow;

determining that a request type of the first attack traffic flow is a first request type;

determining maturity of a virtual honeypot model for the first request type, where the maturity of the virtual honeypot model for the first request type is used to indicate a similarity between a first virtual response traffic flow and a first physical response traffic flow, a first virtual response traffic flow is a response traffic flow that can be generated, in response to an attack traffic flow having the first request type, by a virtual honeypot using the virtual honeypot model, a first physical response traffic flow is a response traffic flow that can be generated by a physical honeypot in response to an attack traffic flow having the first request type, and a higher similarity indicates higher maturity of the virtual honeypot model for the first request type; and if the maturity of the virtual honeypot model for the first request type is higher than a preset maturity threshold that is set for the first request type, forwarding the first attack traffic flow to a virtual honeypot using the virtual honeypot model;

otherwise, forwarding the first attack traffic flow to a physical honeypot; or if the maturity of the virtual honeypot model for the first request type is higher than the preset maturity threshold, forwarding the first attack traffic flow to a virtual honeypot using the virtual honeypot model and a physical honeypot;

otherwise, forwarding the first attack traffic flow only to a physical honeypot.

Therefore, in an embodiment of the present invention, a network traffic flow distributor first determines a request type of a received attack traffic flow and determines maturity of a virtual honeypot model for the request type. When the maturity of the virtual honeypot model for the request type is higher than a maturity threshold that is set for the request type, a virtual honeypot uses the trained virtual honeypot model, and the network traffic flow distributor may forward the attack traffic flow to the virtual honeypot, or forward the attack traffic flow to the virtual honeypot and a physical honeypot. In this case, the virtual honeypot uses the virtual honeypot model of relatively high maturity and is not easily identified by an attacker, and the virtual honeypot determined by using the foregoing method has a feature of relatively low costs.

Optionally, after the forwarding the first attack traffic flow to a physical honeypot, the method further includes:

obtaining a first response traffic flow, where the first response traffic flow is a response traffic flow that is generated, in response to the first attack traffic flow, by the physical honeypot receiving the first attack traffic flow; and training the virtual honeypot model for the first request type according to the first attack traffic flow and the first response traffic flow, and increasing the maturity of the virtual honeypot model for the first request type.

Therefore, in an embodiment of the present invention, a response made by a physical honeypot is dynamically learned, so that a virtual honeypot model making a response with relatively high fidelity can be obtained through training.

Optionally, before the receiving a first attack traffic flow, the method further includes:

obtaining at least two attack traffic flows;

for each of the at least two attack traffic flows, obtaining a response traffic flow of the attack traffic flow, where the response traffic flow of the attack traffic flow is a response traffic flow that is generated by a physical honeypot in response to the attack traffic flow;

for each of the at least two attack traffic flows, determining a generation manner of the response traffic flow that is generated, in response to the attack traffic flow, by the physical honeypot receiving the attack traffic flow;

determining that attack traffic flows that have a same generation manner in the at least two attack traffic flows have a same request type; and recording a feature of attack traffic flows that have a same request type in the at least two attack traffic flows and the corresponding request type; and the determining that a request type of the first attack traffic flow is a first request type includes: if the first attack traffic flow has a feature of an attack traffic flow of the recorded first request type, determining that the request type of the first attack traffic flow is the first request type.

Therefore, in an embodiment of the present invention, when it is the first time for the network traffic flow distributor to receive an attack traffic flow of a request type, the network traffic flow distributor analyzes the attack traffic flow of the request type, and records a feature of the attack traffic flow of the request type. When it is not the first time for the network traffic flow distributor to receive an attack traffic flow of a request type, the network traffic flow distributor may determine the request type of the attack traffic flow according to each recorded request type and a feature of an attack traffic flow corresponding to each request type.

Optionally, the maturity threshold that is set for the first request type is updated.

Therefore, it can be ensured by updating a maturity threshold that is set for each request type that the virtual honeypot can approximate to a real physical honeypot as required.

According to a second embodiment, a network traffic sending apparatus includes:

a network traffic flow distributor, configured to:

receive a first attack traffic flow;

determine that a request type of the first attack traffic flow is a first request type;

determine maturity of a virtual honeypot model for the first request type, where the maturity of the virtual honeypot model for the first request type is used to indicate a similarity between a first virtual response traffic flow and a first physical response traffic flow, a first virtual response traffic flow is a response traffic flow that can be generated, in response to an attack traffic flow having the first request type, by a virtual honeypot using the virtual honeypot model, a first physical response traffic flow is a response traffic flow that can be generated by a physical honeypot in response to an attack traffic flow having the first request type, and a higher similarity indicates higher maturity of the virtual honeypot model for the first request type; and if the maturity of the virtual honeypot model for the first request type is higher than a preset maturity threshold that is set for the first request type, forward the first attack traffic flow to a virtual honeypot using the virtual honeypot model;

otherwise, forward the first attack traffic flow to a physical honeypot; or if the maturity of the virtual honeypot model for the first request type is higher than the preset maturity threshold, forward the first attack traffic flow to a virtual honeypot and a physical honeypot;

otherwise, forward the first attack traffic flow only to a physical honeypot.

Therefore, in an embodiment of the present invention, the network traffic flow distributor first determines a request type of a received attack traffic flow and determines maturity of a virtual honeypot model for the request type. When the maturity of the virtual honeypot model for the request type is higher than a maturity threshold that is set for the request type, a virtual honeypot uses the trained virtual honeypot model, and the network traffic flow distributor may forward the attack traffic flow to the virtual honeypot, or forward the attack traffic flow to the virtual honeypot and a physical honeypot. In this case, the virtual honeypot uses the virtual honeypot model of relatively high maturity and is not easily identified by an attacker, and the virtual honeypot determined by using the foregoing method has a feature of relatively low costs.

Optionally, a network traffic flow learning module is configured to: obtain the first attack traffic flow; and after the network traffic flow distributor forwards the first attack traffic flow to the physical honeypot, obtain a first response traffic flow, where the first response traffic flow is a response traffic flow that is generated, in response to the first attack traffic flow, by the physical honeypot receiving the first attack traffic flow; train the virtual honeypot model for the first request type according to the first attack traffic flow and the first response traffic flow, and increase the maturity of the virtual honeypot model for the first request type; and notify the network traffic flow distributor of an increased maturity of the virtual honeypot model for the first request type; and the network traffic flow distributor is further configured to update the maturity of the virtual honeypot model for the first request type to the maturity of the virtual honeypot model for the first request type that is increased by the network traffic flow learning module.

Therefore, in an embodiment of the present invention, a response made by a physical honeypot is dynamically learned, so that a virtual honeypot model making a response with relatively high fidelity can be obtained through training.

Optionally, the network traffic flow distributor is further configured to: before receiving the first attack traffic flow, obtain at least two attack traffic flows; for each of the at least two attack traffic flows, obtain a response traffic flow of the attack traffic flow, where the response traffic flow of the attack traffic flow is a response traffic flow that is generated by a physical honeypot in response to the attack traffic flow. The network traffic flow learning module is further configured to: for each of the at least two attack traffic flows, determine a generation manner of the response traffic flow that is generated, in response to the attack traffic flow, by the physical honeypot receiving the attack traffic flow; determine that attack traffic flows that have a same generation manner in the at least two attack traffic flows have a same request type; record a feature of attack traffic flows that have a same request type in the at least two attack traffic flows and the corresponding request type, and notify the network traffic flow distributor. The network traffic flow distributor is further configured to record the notified request type and the feature of the attack traffic flow having the request type. The network traffic flow distributor is specifically configured to: when determining that the request type of the first attack traffic flow is the first request type, if the first attack traffic flow has a feature of an attack traffic flow of the recorded first request type, determine that the request type of the first attack traffic flow is the first request type.

Therefore, in an embodiment of the present invention, when it is the first time for the network traffic flow distributor to receive an attack traffic flow of a request type, the network traffic flow distributor analyzes the attack traffic flow of the request type, and records a feature of the attack traffic flow of the request type. When it is not the first time for the network traffic flow distributor to receive an attack traffic flow of a request type, the network traffic flow distributor may determine the request type of the attack traffic flow according to each recorded request type and a feature of an attack traffic flow corresponding to each request type.

Optionally, a threshold setting module is configured to update the maturity threshold that is set for the first request type.

Therefore, it can be ensured by updating a maturity threshold that is set for each request type that the virtual honeypot can approximate to a real physical honeypot as required.

According to a third embodiment, a hybrid honeypot system includes: the network traffic flow distributor according to the second aspect, at least one physical honeypot, and at least one virtual honeypot. The network traffic flow distributor is configured to:

receive a first attack traffic flow;

determine that a request type of the first attack traffic flow is a first request type;

determine maturity of a virtual honeypot model for the first request type, where the maturity of the virtual honeypot model for the first request type is used to indicate a similarity between a first virtual response traffic flow and a first physical response traffic flow, a first virtual response traffic flow is a response traffic flow that can be generated, in response to an attack traffic flow having the first request type, by a virtual honeypot using the virtual honeypot model, a first physical response traffic flow is a response traffic flow that can be generated by a physical honeypot in response to an attack traffic flow having the first request type, and a higher similarity indicates higher maturity of the virtual honeypot model for the first request type; and if the maturity of the virtual honeypot model for the first request type is higher than a preset maturity threshold that is set for the first request type, forward the first attack traffic flow to a virtual honeypot using the virtual honeypot model; otherwise, forward the first attack traffic flow to a physical honeypot; or if the maturity of the virtual honeypot model for the first request type is higher than the preset maturity threshold, forward the first attack traffic flow to a virtual honeypot using the virtual honeypot model and a physical honeypot; otherwise, forward the first attack traffic flow only to a physical honeypot.

Optionally, the hybrid honeypot system further includes the network traffic flow learning module according to the second aspect. Optionally, the network traffic flow learning module may be configured to:

obtain the first attack traffic flow; and after the network traffic flow distributor forwards the first attack traffic flow to the physical honeypot, obtain a first response traffic flow, where the first response traffic flow is a response traffic flow that is generated, in response to the first attack traffic flow, by the physical honeypot receiving the first attack traffic flow;

train the virtual honeypot model for the first request type according to the first attack traffic flow and the first response traffic flow, and increase the maturity of the virtual honeypot model for the first request type; and notify the network traffic flow distributor of an increased maturity of the virtual honeypot model for the first request type; and the network traffic flow distributor is further configured to update the maturity of the virtual honeypot model for the first request type to the maturity of the virtual honeypot model for the first request type that is increased by the network traffic flow learning module.

Optionally, the hybrid honeypot system further includes the threshold setting module according to the second embodiment.

According to a fourth embodiment, a network traffic sending apparatus includes:

at least one memory, configured to store machine readable code; and at least one processor, configured to execute the machine readable code stored in the memory, to implement the method according to any one of the first aspect or the optional implementations of the first aspect.

According to a fifth embodiment, a machine readable medium is provided, where the machine readable medium stores machine readable code, and when the machine readable code is executed by at least one processor, the method according to any one of the first aspect or the optional implementations of the first aspect is implemented.

In an existing honeypot system, a physical honeypot is highly interactive, but costs of deploying a large quantity of physical honeypots in the honeypot system are relatively high. A virtual honeypot emulates an actual physical honeypot by using software and has relatively low costs, but the virtual honeypot is mainly created manually. Consequently, a relatively fixed response mode is configured for the virtual honeypot in the prior art, and the virtual honeypot is easily identified by an attacker and has relatively poor interactivity.

To resolve the foregoing technical problem, embodiments of the present invention provide a network traffic sending method and apparatus, and a hybrid honeypot system. In the method, a network traffic flow distributor first determines a request type of a received attack traffic flow and determines maturity of a virtual honeypot model for the request type. When the maturity of the virtual honeypot model for the request type is higher than a maturity threshold that is set for the request type, a virtual honeypot uses the trained virtual honeypot model, and the network traffic flow distributor may forward the attack traffic flow to the virtual honeypot, or forward the attack traffic flow to the virtual honeypot and a physical honeypot. In this case, the virtual honeypot uses the virtual honeypot model of relatively high maturity and is not easily identified by an attacker, and the virtual honeypot determined by using the foregoing method has a feature of relatively low costs.

To make the objectives, technical solutions, and advantages of the embodiments of the present invention clearer and more comprehensible, the following further describes the embodiments of the present invention in detail with reference to the accompanying drawings. Embodiments that are described subsequently are merely some but not all of the embodiments of the present invention.

Figure 1:
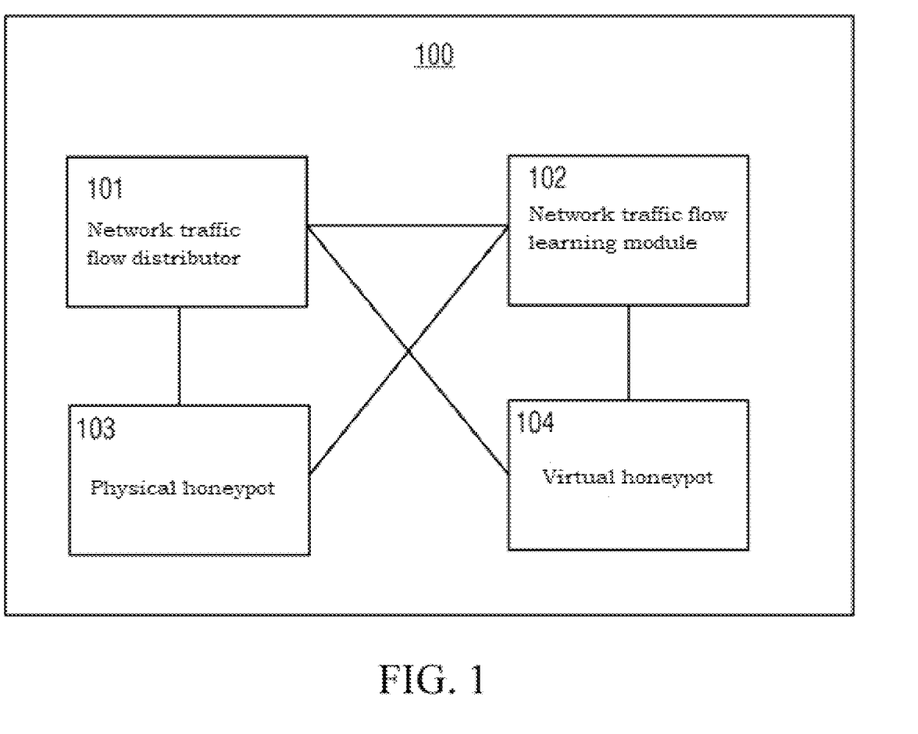
FIG. 1 shows a hybrid honeypot system according to an embodiment of the present invention.

As shown in FIG. 1, an embodiment of the present invention provides a hybrid honeypot system 100.

The system includes a network traffic flow distributor 101, a network traffic flow learning module 102, at least one physical honeypot 103, and at least one virtual honeypot 104.

The network traffic flow distributor 101 and the network traffic flow learning module 102 may be located in one device or may be located in two different devices.

The network traffic flow distributor 101 may communicate with the network traffic flow learning module 102, and the network traffic flow distributor 101 may communicate with the physical honeypot 103 and the virtual honeypot 104. The network traffic flow learning module 102 may communicate with the physical honeypot 103 and the virtual honeypot 104.

The network traffic flow distributor 101 is configured to: receive an attack traffic flow and forward the attack traffic flow according to a preset rule.

The network traffic flow learning module 102 is configured to: train a virtual honeypot model for each request type and increase maturity of the virtual honeypot model for each request type.

The physical honeypot 103 is configured to: respond to the attack traffic flow forwarded by the network traffic flow distributor 101, and generate a corresponding response traffic flow.

The virtual honeypot 104 is configured to: respond to the attack traffic flow forwarded by the network traffic flow distributor 101, and generate a corresponding response traffic flow. The virtual honeypot 104 uses a trained virtual honeypot model.

Specific functions of the network traffic flow distributor 101 and the network traffic flow learning module 102 are described in detail below, and are merely briefly described herein. A network traffic processing method using the hybrid honeypot system is described below with reference to FIG. 2.

Figure 2:
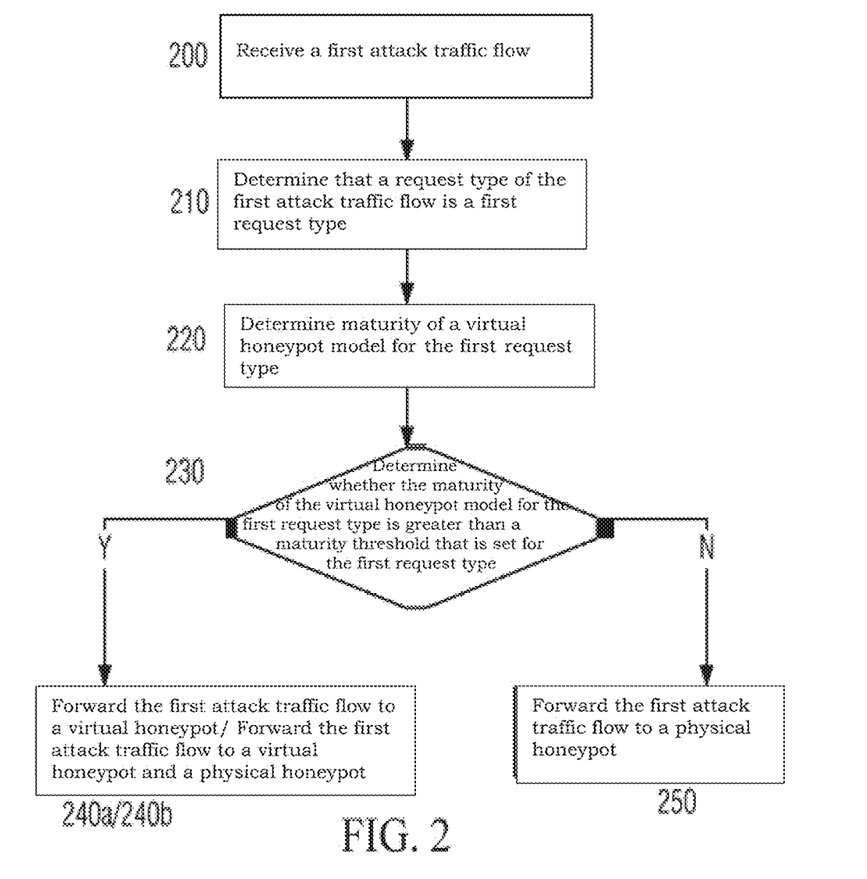
FIG. 2 is a general flowchart of a network traffic sending method according to an embodiment of the present invention.

As shown in FIG. 2, an embodiment of the present invention provides a network traffic sending method, including the following steps.

Step 200: A network traffic flow distributor 101 receives a first attack traffic flow.

Step 210: The network traffic flow distributor 101 determines that a request type of the first attack traffic flow is a first request type.

Step 220: The network traffic flow distributor 101 determines maturity of a virtual honeypot model for the first request type.

The maturity of the virtual honeypot model for the first request type is used to indicate a similarity between a first virtual response traffic flow and a first physical response traffic flow. A first virtual response traffic flow is a response traffic flow that can be generated, in response to an attack traffic flow having the first request type, by a virtual honeypot 104 using the model. A first physical response traffic flow is a response traffic flow that can be generated by a physical honeypot in response to an attack traffic flow having the first request type. A higher similarity indicates higher maturity of the virtual honeypot model for the first request type.

Step 230: The network traffic flow distributor 101 determines whether the maturity of the virtual honeypot model for the first request type is greater than a preset maturity threshold that is set for the first request type; and if a determining result of the network traffic flow distributor 101 is yes (Y), performs step 240*a* or step 240*b*; or if a determining result of the network traffic flow distributor 101 is no (N), performs step 250.

Step 240*a*: The network traffic flow distributor 101 forwards the first attack traffic flow to a virtual honeypot 104 using the model.

Step 240*b*: The network traffic flow distributor 101 forwards the first attack traffic flow to a virtual honeypot 104 using the model and a physical honeypot 103.

Step 240*a* and step 240*b* are two optional implementations, and may be selected according to an actual situation during implementation. For example, if the maturity of the virtual honeypot model is expected to be further increased when the maturity of the virtual honeypot model is already higher than the maturity threshold that is set, step 240*b* may be chosen to be performed; otherwise, step 240*a* may be chosen to be performed. During implementation, one of the two optional implementations may be selected by using a switch.

Step 250: The network traffic flow distributor 101 forwards the first attack traffic flow to a physical honeypot 103.

By means of the foregoing method, a problem that a fixed response mode is configured for the virtual honeypot 104 and the virtual honeypot 104 is easily identified by an attacker can be resolved. By means of the method provided in this embodiment of the present invention, a virtual honeypot using a virtual honeypot model of relatively high maturity responds to an attack traffic flow and is not easily identified by an attacker, and has a feature of relatively low costs.

After forwarding the first attack traffic flow to a physical honeypot, the network traffic flow learning module 102 obtains a first response traffic flow, where the first response traffic flow is a response traffic flow that is generated, in response to the first attack traffic flow, by the physical honeypot receiving the first attack traffic flow; and trains the virtual honeypot model for the first request type according to the first attack traffic flow and the first response traffic flow, and increases the maturity of the virtual honeypot model for the first request type.

Therefore, when the maturity of the virtual honeypot model for the first request type does not reach the preset maturity threshold that is set for the first request type, a response traffic flow generated by the virtual honeypot model for the first request type is not sent, and is used only to train the virtual honeypot model. In this case, the network traffic flow learning module 102 analyzes the response traffic flow generated by the virtual honeypot model for the first request type, compares the response traffic flow with the first response traffic flow, trains the virtual honeypot model according to the first response traffic flow and the first attack traffic flow, and increases the maturity of the virtual honeypot model.

The maturity of the virtual honeypot model for the first request type increases with an increase in the number of times of training the virtual honeypot model for the first request type by the network traffic flow learning module 102. An increase in a similarity between the response traffic flow generated by the virtual honeypot model for the first request type and the first response traffic flow means that the response traffic flow generated by the virtual honeypot model for the first request type can increasingly approximate to the first response traffic flow.

After the maturity of the virtual honeypot model for the first request type is increased, the network traffic flow distributor 101 updates the maturity of the virtual honeypot model for the first request type to the maturity of the virtual honeypot model for the first request type that is increased by the network traffic flow learning module 102.

Step 210 of determining, by the network traffic flow distributor 101, that a request type of the first attack traffic flow is a first request type may use, but is not limited to, the following method: Before the network traffic flow distributor 101 receives the first attack traffic flow, the network traffic flow distributor 101 obtains at least two attack traffic flows, and for each of the at least two attack traffic flows, obtains a response traffic flow of the attack traffic flow, where the response traffic flow of the attack traffic flow is a response traffic flow that is generated by a physical honeypot in response to the attack traffic flow.

Further, for each of the at least two attack traffic flows, the network traffic flow learning module 102 determines a generation manner of the response traffic flow that is generated, in response to the attack traffic flow, by the physical honeypot receiving the attack traffic flow, determines that attack traffic flows that have a same generation manner in the at least two attack traffic flows have a same request type, and records a feature of attack traffic flows that have a same request type in the at least two attack traffic flows and the corresponding request type.

The network traffic flow learning module 102 notifies the network traffic flow distributor 101 of the feature of the attack traffic flows that have the same request type in the at least two attack traffic flows and the corresponding request type; and the network traffic flow distributor 101 records the notified request type and the feature of the attack traffic flow having the request type.

Therefore, when the network traffic flow distributor 101 receives the first attack traffic flow, the network traffic flow distributor 101 determines a feature of the first attack traffic flow according to the notified and recorded request type and the feature of the attack traffic flow having the request type, and when determining that the feature of the first attack traffic flow is the same as the feature of the attack traffic flow of the first request type, the network traffic flow distributor 101 determines that the request type of the first attack traffic flow is the first request type.

For example, for an attack traffic flow 1, the physical honeypot generates, by using a rule 1, a response traffic flow corresponding to the attack traffic flow 1. For an attack traffic flow 2, the physical honeypot generates, by using a rule 2, a response traffic flow corresponding to the attack traffic flow 2. The rule 1 is different from the rule 2. Therefore, a request type of the attack traffic flow 1 is different from a request type of the attack traffic flow 2. For an attack traffic flow 3, the physical honeypot generates, by using the rule 1, a response traffic flow corresponding to the attack traffic flow 3. Generation manners of generating the response traffic flows for the attack traffic flow 1 and the attack traffic flow 3 are the same, and both use the rule 1. Therefore, the request type of the attack traffic flow 1 is same as a request type of the attack traffic flow 3. Further, the network traffic flow learning module 102 records a feature of the attack traffic flow 1 and a feature of the attack traffic flow 3, and records a type of an attack traffic flow having the foregoing feature as a request type 1. The network traffic flow learning module 102 notifies the network traffic flow distributor 101 of the request type 1 and the feature corresponding to the request type 1. The network traffic flow distributor 101 receives an attack traffic flow 4, and if the attack traffic flow 4 has the feature of the attack traffic flow of the recorded request type 1, determines that a request type of the attack traffic flow 4 is the request type 1.

Therefore, when it is the first time for the network traffic flow distributor 101 to receive an attack traffic flow of a request type, the network traffic flow distributor 101 analyzes the attack traffic flow of the request type, and records a feature of the attack traffic flow of the request type. When it is not the first time for the network traffic flow distributor 101 to receive an attack traffic flow of a request type, the network traffic flow distributor 101 may determine the request type of the attack traffic flow according to each recorded request type and a feature of an attack traffic flow corresponding to each request type.

In a possible design, the maturity threshold that is set for the first request type may be configured and updated as required, which may be implemented by using a threshold setting module. The threshold setting module may be disposed in a same device as the network traffic flow distributor 101, or is a component of the network traffic flow distributor 101.

For example, the maturity threshold that is set for the first request type is 90, and after the maturity threshold that is set for the first request type is updated, the maturity threshold that is set for the first request type is 95.

For example, Table 1 shows maturity of virtual honeypot models corresponding to different request types.

TABLE 1

| Sequence number | Request type | Maturity | Virtual honeypot identifier (ID) |
|---|---|---|---|
| 1 | 1fae22a3c3a05944 | 87 | 1 |
| 2 | 1fae22a3c3a05947 | 65 | 2 |
| 3 | 1fae22a3c3a05945 | 93 | 1 |
| 4 | 2adc6d15b949329a | 34 | 3 |
| 5 | 2adc6d15b949329a | 88 | 2 |
| 6 | 6d15b949329a235b | 23 | 2 |

In a possible design, the threshold setting module may configure a maturity threshold of a virtual honeypot model for each request type, or configure a same maturity threshold of virtual honeypot models.

For example, if a maturity threshold of a virtual honeypot model corresponding to the request type with the sequence number 1 in Table 1 is 90, maturity of the virtual honeypot model for the request type does not reach the threshold.

For another example, if a maturity threshold of a virtual honeypot model corresponding to the request type with the sequence number 5 in Table 1 is 85, maturity of the virtual honeypot model for the request type reaches the threshold.

Optionally, during training of the virtual honeypot model, a virtual honeypot may be generated, but is not used to receive an attack traffic flow. Alternatively, a virtual honeypot may be generated after the virtual honeypot model is trained to be mature, that is, the maturity of the model is greater than the maturity threshold, and the generated virtual honeypot is used to receive an attack traffic flow.

As shown in Table 1, one virtual honeypot 104 may process an attack traffic flow of at least one request type. For example, a virtual honeypot whose ID is 1 can process attack traffic flows of request types with sequence numbers 1 and 3. A virtual honeypot whose ID is 2 can process attack traffic flows of request types with sequence numbers 2, 5 and 6.

In addition, when a quantity of attack traffic flows of the request type with the sequence number 3 is increased, the virtual honeypot whose ID is 2 may be further configured to process an attack traffic flow of the request type with the sequence number 3. Alternatively, a virtual honeypot whose ID is 4 is newly created, and is used to process an attack traffic flow of the request type with the sequence number 3. Therefore, by means of the method provided in this embodiment of the present invention, the virtual honeypot 104 can be extended dynamically as required, and multiple virtual honeypots 104 may use a trained virtual honeypot model, so that the virtual honeypot 104 is configured more flexibly.

For step 240a and step 240b, when the maturity of the virtual honeypot model for the first request type is higher than the preset maturity threshold that is set for the first request type, the network traffic flow distributor 101 may process the first attack traffic flow by using either of the following two manners.

In a first manner, the network traffic flow distributor 101 forwards the first attack traffic flow to a virtual honeypot 104 using the model.

In this case, the virtual honeypot 104 using the model can already generate a response traffic flow whose similarity with a response traffic flow generated by the physical honeypot 103 is relatively high. The virtual honeypot 104 generates a response traffic flow for the first attack traffic flow, so that processing pressure of the physical honeypot 103 can be reduced. In this case, however, the virtual honeypot model for the first request type is no more trained, and the maturity of the virtual honeypot model for the first request type is no more increased.

After generating the response traffic flow of the first attack traffic flow, the virtual honeypot 104 forwards the response traffic flow of the first attack traffic flow to the network traffic flow distributor 101, and the network traffic flow distributor 101 sends the response traffic flow of the first attack traffic flow to a device sending the first attack traffic flow.

In a second manner, the network traffic flow distributor 101 forwards the first attack traffic flow to a virtual honeypot 104 using the model and a physical honeypot 103.

In this case, the virtual honeypot model for the first request type can still be trained, and the maturity of the virtual honeypot model for the first request type can still be increased, so that the virtual honeypot 104 using the model increasingly approximates to the physical honeypot 103.

After generating the response traffic flow of the first attack traffic flow, the virtual honeypot 104 forwards the response traffic flow of the first attack traffic flow to the network traffic flow distributor 101, and the network traffic flow distributor 101 sends the response traffic flow of the first attack traffic flow to a device sending the first attack traffic flow. Alternatively, after the physical honeypot 103 generates the first response traffic flow, the physical honeypot 103 forwards the first response traffic flow to the network traffic flow distributor 101, and the network traffic flow distributor 101 sends the first response traffic flow to a device sending the first attack traffic flow.

In addition, in a possible design, when the network traffic flow distributor 101 determines for the first time that the maturity of the virtual honeypot model for the first request type is higher than the preset maturity threshold that is set for the first request type, if the network traffic flow distributor 101 receives an attack traffic flow of the first request type next time, the network traffic flow distributor 101 may directly forward the attack traffic flow to the virtual honeypot 104 using the virtual honeypot model, without determining each time that the maturity of the virtual honeypot model for the first request type is higher than the preset maturity threshold that is set for the first request type.

Based on the same inventive concept, an embodiment of the present invention provides a network traffic sending apparatus, including: a network traffic flow distributor 101, configured to:

receive a first attack traffic flow;

determine that a request type of the first attack traffic flow is a first request type;

determine maturity of a virtual honeypot model for the first request type, where the maturity of the virtual honeypot model for the first request type is used to indicate a similarity between a first virtual response traffic flow and a first physical response traffic flow, a first virtual response traffic flow is a response traffic flow that can be generated, in response to an attack traffic flow having the first request type, by a virtual honeypot 104 using the model, a first physical response traffic flow is a response traffic flow that can be generated by a physical honeypot 103 in response to an attack traffic flow having the first request type, and a higher similarity indicates higher maturity of the virtual honeypot model for the first request type; and if the maturity of the model for the first request type is higher than a preset maturity threshold that is set for the first request type, forward the first attack traffic flow to a virtual honeypot 104 using the model; otherwise, forward the first attack traffic flow to a physical honeypot 103; or if the maturity of the virtual honeypot model for the first request type is higher than the preset maturity threshold, forward the first attack traffic flow to a virtual honeypot 104 using the model and a physical honeypot 103; otherwise, forward the first attack traffic flow only to a physical honeypot 103.

Optionally, a network traffic flow learning module 102 is configured to:

obtain the first attack traffic flow; and after the network traffic flow distributor 101 forwards the first attack traffic flow to the physical honeypot 103, obtain a first response traffic flow, where the first response traffic flow is a response traffic flow that is generated, in response to the first attack traffic flow, by the physical honeypot 103 receiving the first attack traffic flow;

train the virtual honeypot model for the first request type according to the first attack traffic flow and the first response traffic flow, and increase the maturity of the virtual honeypot model for the first request type; and notify the network traffic flow distributor 101 of an increased maturity of the virtual honeypot model for the first request type.

The network traffic flow distributor 101 is further configured to update the maturity of the virtual honeypot model for the first request type to the maturity of the virtual honeypot model for the first request type that is increased by the network traffic flow learning module.

Optionally, the network traffic flow distributor 101 is further configured to: before receiving the first attack traffic flow, obtain at least two attack traffic flows; and for each of the at least two attack traffic flows, obtain a response traffic flow of the attack traffic flow, where the response traffic flow of the attack traffic flow is a response traffic flow that is generated by the physical honeypot 103 in response to the attack traffic flow.

The network traffic flow learning module is further configured to:

for each of the at least two attack traffic flows, determine a generation manner of the response traffic flow that is generated, in response to the attack traffic flow, by the physical honeypot 103 receiving the attack traffic flow;

determine that attack traffic flows that have a same generation manner in the at least two attack traffic flows have a same request type; and record a feature of attack traffic flows that have a same request type in the at least two attack traffic flows and the corresponding request type, and notify the network traffic flow distributor 101.

The network traffic flow distributor 101 is further configured to record the notified request type and the feature of the attack traffic flow having the request type.

The network traffic flow distributor 101 is specifically configured to: when determining that the request type of the first attack traffic flow is the first request type, if the first attack traffic flow has the recorded feature of the attack traffic flow of the first request type, determine that the request type of the first attack traffic flow is the first request type.

Optionally, a threshold setting module is configured to update the maturity threshold that is set for the first request type.

Figure 3:
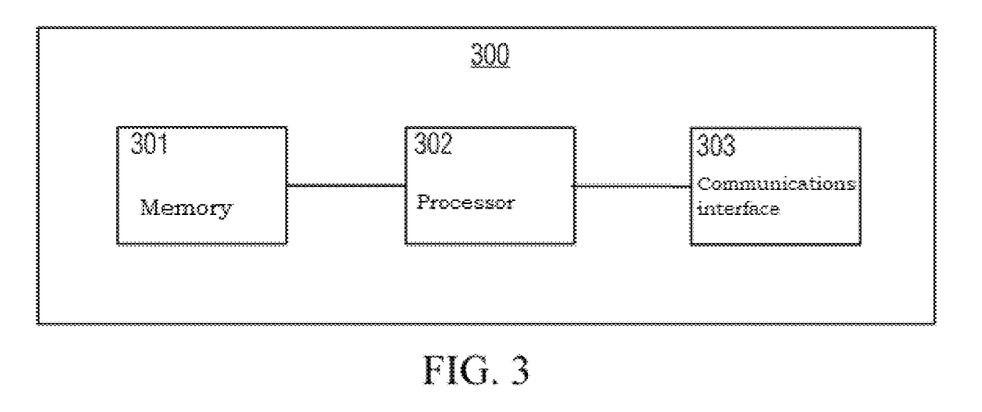
FIG. 3 is a schematic structural diagram of a network traffic sending apparatus according to an embodiment of the present invention.

Based on the same inventive concept, referring to FIG. 3, an embodiment of the present invention provides a network traffic sending apparatus 300, including:

at least one memory 301, configured to store machine readable code; and at least one processor 302, configured to execute the machine readable code stored in the memory, to implement the method shown in FIG. 2.

Optionally, the network traffic sending apparatus 300 further includes a communications interface 303. The communications interface 303 is configured to: receive an attack traffic flow, and send a response traffic flow of the received attack traffic flow. For example, the communications interface 303 receives an attack traffic flow 1 from a device 1, the processor obtains a response traffic flow of the attack traffic flow 1 by using the method shown in FIG. 2, and the communications interface sends the response traffic flow of the attack traffic flow 1 to the device 1.

The at least one memory 301, the at least one processor 302, and the communications interface 303 may be connected to each other by using a bus.

An embodiment of the present invention provides a machine readable medium. The machine readable medium stores machine readable code, and when the machine readable code is executed by at least one processor, the method shown in FIG. 2 is implemented.

It should be noted that, not all steps and modules in the foregoing procedures and various system structural diagrams are necessary, and some steps or modules may be ignored according to an actual requirement. An execution order of the steps is not fixed, and may be adjusted as required. System structures described in the foregoing embodiments may be physical structures or may be logical structures, that is, some modules may be implemented by using a same physical entity or some modules may be implemented by using at least two physical entities or may be jointly implemented by some components in at least two independent devices.

In the foregoing embodiments, hardware units may be implemented mechanically or electrically. For example, a hardware unit may include a dedicated permanent circuit or logic (for example, a dedicated processor, a field programmable gate array (FPGA), or an application-specific integrated circuit (ASIC)) to complete corresponding operations. The hardware unit may further include a programmable logic or circuit (for example, a general-purpose processor or another programmable processor), and corresponding operations may be completed by using software that is temporarily set. A specific implementation (a mechanical manner, a dedicated permanent circuit, or a circuit that is temporarily set) may be determined by considering costs and time.

The embodiments of the present invention are presented and described in detail above by using the accompanying drawings and the preferred embodiments. However, the embodiments of the present invention are not limited to these disclosed embodiments. Based on the foregoing embodiments, a person skilled in the art may know that, more embodiments of the present invention can be obtained by combining code review means in the foregoing different embodiments, and these embodiments should also fall within the protection scope of the embodiments of the present invention.

What is claimed is:

1. A network traffic method, comprising:
receiving a first traffic flow;
determining the first traffic flow includes a first feature of a first attack traffic flow;
determining, a maturity of a first virtual honeypot model based on the determining that the first traffic flow includes the first feature; and
forwarding, in response to the maturity of the first virtual honeypot model being higher than a maturity threshold corresponding to the first traffic flow having the first feature, the first traffic flow to a virtual honeypot using the first virtual honeypot model, and
forwarding, in response to the maturity of the first virtual honeypot model being lower than the maturity threshold, the first traffic flow to a physical honeypot; or
forwarding, in response to the maturity of the first virtual honeypot model being higher than the maturity threshold, the first traffic flow to the physical honeypot and the virtual honeypot using the first virtual honeypot model, and
forwarding, in response to the maturity of the first virtual honeypot model being lower than the maturity threshold, the first traffic flow only to the physical honeypot.

2. The method of claim 1, wherein after the forwarding of the first traffic flow to the physical honeypot, the method further comprises:
obtaining a first response traffic flow, wherein the first response traffic flow is a response traffic flow that is generated, in response to the first traffic flow, by the physical honeypot receiving the first traffic flow;
training the first virtual honeypot model according to the first traffic flow and the first response traffic flow; and
increasing the maturity of the first virtual honeypot model.

3. The method of claim 1, wherein before the receiving the first traffic flow, the method further comprises:
obtaining at least two attack traffic flows;
obtaining, for each of the at least two attack traffic flows, a response traffic flow generated by the physical honeypot in response to the attack traffic flow;
determining, for each of the at least two attack traffic flows, a generation manner of the response traffic flow for the attack traffic flow;
determining that the at least two attack traffic flows that have a same generation manner and have a first request type; and
recording a feature of each of the at least two attack traffic flows as the first feature of the first request type; wherein the determining that the first traffic flow includes the first feature includes,
determining that the request type of the first traffic flow is the first request type, in response to the first traffic flow having the first feature of the first attack traffic flow.

4. The method of claim 1, further comprising:
updating the maturity threshold corresponding to the first traffic flow having the first feature.

5. A network traffic sending apparatus, comprising:
at least one memory, configured to store machine readable code; and
at least one processor, configured to execute the machine readable code to cause the network traffic sending apparatus to
receive a first traffic flow,
determine that a request type of the first traffic flow includes a first feature of a first attack traffic flow,
determine a maturity of a first virtual honeypot model based on determining that the first traffic flow includes the first feature, and
forward, in response to the maturity of the first virtual honeypot model being higher than a maturity threshold corresponding to the first traffic flow having the first feature, the first traffic flow to a virtual honeypot using the first virtual honeypot model, and forward, the first traffic flow to a physical honeypot, in response to the maturity of the first virtual honeypot model being lower than the maturity threshold, or
forward, in response to the maturity of the first virtual honeypot model being higher than the maturity threshold, the first traffic flow to the physical honeypot and the virtual honeypot using the first virtual honeypot model and forward, the first traffic flow only to the physical honeypot, in response to the maturity of the first virtual honeypot model being lower than the maturity threshold.

6. The apparatus of claim 5, wherein the at least one processor is further configured to execute the machine readable code to cause the network traffic sending apparatus, before receiving of the first traffic flow, to:
obtain at least two attack traffic flows;
obtain, for each of the at least two attack traffic flows, a response traffic flow generated by the physical honeypot in response to the attack traffic flow;
determine, for each of the at least two attack traffic flows, a generation manner of the response traffic flow of the attack traffic flow;
determine that the at least two attack traffic flows have a same generation manner and have a first request type; and
record a feature of the at least two attack traffic flows in the at least two attack traffic flows as the first feature of the first request type, wherein
the at least one processor is configured to execute the machine readable code to cause the network traffic sending apparatus to determine that the request type of the first traffic flow includes the first feature by determining that the request type of the first traffic flow is the first request type, in response to the first traffic flow having the first feature of the first attack traffic flow of the first request type.

7. The apparatus of claim 5, wherein the at least one processor is further configured to execute the machine readable code to cause the network traffic sending apparatus to, after forwarding of the first traffic flow to the physical honeypot:

obtain a first response traffic flow, the first response traffic flow being a response traffic flow that is generated, in response to the first traffic flow, by the physical honeypot receiving the first traffic flow;
train the first virtual honeypot model according to the first traffic flow and the first response traffic flow; and
increase the maturity of the first virtual honeypot model.

8. The apparatus of claim 5, wherein the at least one processor is further configured to execute the machine readable code to cause the network traffic sending apparatus to:
update the maturity threshold corresponding to the first traffic flow having the first feature set for the first request type.

9. A non-transitory machine readable medium, wherein the machine readable medium stores machine readable code, and upon the machine readable code being executed by at least one processor, the at least one processor is configured to:
receive a first traffic flow;
determine the first traffic flow; includes a first feature of a first attack traffic flow;
determine a maturity of a first virtual honeypot model based on determining that the first traffic flow includes the first feature; and
forward, in response to the maturity of the first virtual honeypot model being higher than a maturity threshold corresponding to the first traffic flow having the first feature, the first traffic flow to a virtual honeypot using the first virtual honeypot model, and forward the first traffic flow to a physical honeypot, in response to the maturity of the first virtual honeypot model being lower than the maturity threshold, or
forward, in response to the maturity of the first virtual honeypot model being higher than the maturity threshold, the first traffic flow to the physical honeypot and the virtual honeypot using the first virtual honeypot model, and forward the first traffic flow only to the physical honeypot, in response to the maturity of the first virtual honeypot model being lower than the maturity threshold.

10. The non-transitory machine readable medium of claim 9, wherein upon the machine readable code being executed by the at least one processor, the at least one processor is further configured to, after forwarding of the first traffic flow to the physical honeypot:
obtain a first response traffic flow, the first response traffic flow being a response traffic flow that is generated, in response to the first traffic flow, by the physical honeypot receiving the first traffic flow;
train the first virtual honeypot model according to the first traffic flow and the first response traffic flow; and
increase the maturity of the first virtual honeypot model.

11. The non-transitory machine readable medium of claim 9, wherein upon the machine readable code being executed by the at least one processor, the at least one processor is further configured to, before receiving the first traffic flow:
obtain at least two attack traffic flows;
obtain, for each of the at least two attack traffic flows, a response traffic flow generated by the physical honeypot in response to the attack traffic flow;
determine, for each of the at least two attack traffic flows, a generation manner of the response traffic flow for the attack traffic flow;
determine that the at least two attack traffic flows have a same generation manner and have a first request type; and record a feature of each of the at least two attack traffic flows as the first feature of the first request type,
wherein determining that of the first traffic flow includes the first feature includes
determining, that the request type of the first traffic flow is the first request type, in response to the first traffic flow including the feature of the first traffic flow of the first request type.

12. The non-transitory machine readable medium of claim 9, wherein upon the machine readable code being executed by the at least one processor, the at least one processor is further configured to:
update the maturity threshold corresponding to the first traffic flow having the first feature.

* * * * *